United States Patent
Eckl et al.

(12)

(10) Patent No.: US 7,334,388 B2
(45) Date of Patent: Feb. 26, 2008

(54) LINK PLATE FOR AN ENERGY TRANSMISSION CHAIN, AND CORRESPONDING ENERGY TRANSMISSION CHAIN

(75) Inventors: Erwin Eckl, Siegen (DE); Heiner Samen, Marienheide (DE); Herbert Wehler, Neunkirchen (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 10/568,840

(22) PCT Filed: Aug. 6, 2004

(86) PCT No.: PCT/EP2004/008803

§ 371 (c)(1),
(2), (4) Date: Sep. 7, 2006

(87) PCT Pub. No.: WO2005/021996

PCT Pub. Date: Mar. 10, 2005

(65) Prior Publication Data

US 2007/0032141 A1    Feb. 8, 2007

(30) Foreign Application Priority Data

Aug. 21, 2003    (DE) .................. 103 39 168

(51) Int. Cl.
*F16G 13/16*    (2006.01)
(52) U.S. Cl. ............... 59/78.1; 248/49; 248/51
(58) Field of Classification Search .............. 59/78.1, 59/78; 548/49, 51
See application file for complete search history.

(56) References Cited

U.S. PATENT DOCUMENTS 4,499,720 A * 2/1985 Klein ................... 59/78.1

(Continued)

FOREIGN PATENT DOCUMENTS

DE        38 37 764 C1    4/1990

(Continued)

OTHER PUBLICATIONS

English language Abstract of DE 38 37 764 C1, European Patent Office esp@cenet database, 1p.

(Continued)

*Primary Examiner*—David B Jones
(74) *Attorney, Agent, or Firm*—Smith Law Office

(57) ABSTRACT

A link plate is proposed for forming at least one member of an energy guide chain, which has overlap regions with stops that limit the angular position of the energy guide chain. Each of the overlap regions has a central region which is surrounded by at least two regions in which some stop faces are formed. It is proposed that a first region has stop faces where these stop faces, in the case of an energy guide chain composed from link plates, determine a curvature region in a transition region between a lower trunk and upper trunk of the energy guide chain. The second region has stop faces which determine a prestressing in the energy guide chain. In addition to the two regions, the link plate may have a third region, which has at least one stop with at least one stop face, where the stop has a spring-elastic characteristic. Through the spring-elastic characteristic, damping of the movement during a pivoting process of the link plates is achieved.

20 Claims, 4 Drawing Sheets

U.S. PATENT DOCUMENTS

| | | | | |
|---|---|---|---|---|
| 4,590,961 A | * | 5/1986 | Schumann | 248/49 |
| 4,625,507 A | * | 12/1986 | Moritz et al. | 59/78.1 |
| 5,048,283 A | * | 9/1991 | Moritz et al. | 59/78.1 |
| 5,157,913 A | | 10/1992 | Wehler et al. | |
| 5,220,779 A | * | 6/1993 | Tatsuta et al. | 59/78.1 |
| 5,247,961 A | | 9/1993 | Micheau et al. | |
| 5,768,882 A | * | 6/1998 | Weber et al. | 59/78.1 |
| 5,771,676 A | * | 6/1998 | Komiya et al. | 59/78.1 |
| 6,161,372 A | * | 12/2000 | Wehler | 59/78.1 |
| 6,161,373 A | | 12/2000 | Heidrich et al. | |
| 6,173,560 B1 | * | 1/2001 | Weber | 59/78.1 |
| 6,371,876 B1 | | 4/2002 | Blase | |
| 6,992,254 B2 | * | 1/2006 | Komiya | 174/138 B |

FOREIGN PATENT DOCUMENTS

| | | | |
|---|---|---|---|
| DE | 3837764 C | * | 4/1990 |
| DE | 692 01 682 T2 | | 10/1995 |
| DE | 296 07 492 U1 | | 10/1997 |
| DE | 197 03 885 A1 | | 8/1998 |
| DE | 197 15 531 A1 | | 10/1998 |
| DE | 297 11 441 U1 | | 2/1999 |
| DE | 696 07 101 T2 | | 11/2000 |
| EP | 0 499 809 A1 | | 8/1992 |
| EP | 0 856 683 A1 | | 1/1998 |
| EP | 0856683 A | * | 8/1998 |
| EP | 1 267 094 A2 | | 12/2002 |
| EP | 1267094 A | * | 12/2002 |
| EP | 1 267 094 A3 | | 1/2004 |
| WO | WO 98/40645 | | 9/1998 |

OTHER PUBLICATIONS

English language Abstract of DE 197 03 885 A1, European Patent Office esp@cenet database, 1p.

English language Abstract of EP 0 856 683 A1, European Patent Office esp@cenet database, 1p.

* cited by examiner

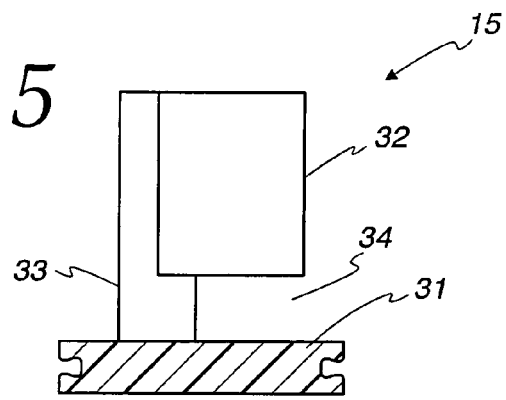
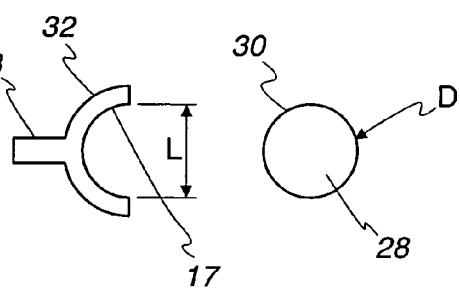
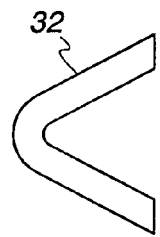
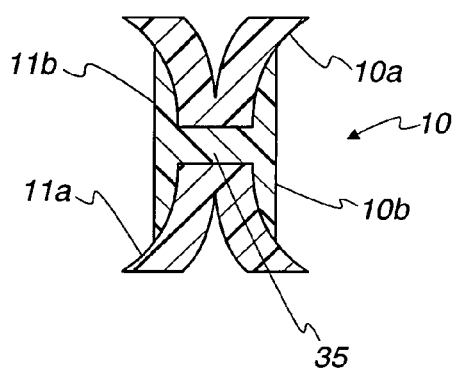

LINK PLATE FOR AN ENERGY TRANSMISSION CHAIN, AND CORRESPONDING ENERGY TRANSMISSION CHAIN

FIELD AND BACKGROUND OF THE INVENTION

The object of the invention refers to a link plate for an energy guide chain as well as to an energy guide chain.

Wiring guide units for active guidance of lines, cables or similar devices have a first end, which is fixed locally, and a second end, which is movable, and are known in numerous embodiments.

The classical wiring guide unit also called energy guide chain or briefly energy chain, includes individual chain links connected to each other by linking, to form a common guide channel. Lines, cables or similar elongate and flexible devices are arranged in this guide channel.

A wiring guide unit is known from WO 98/40645, consisting of one-piece protective elements made of plastic. The protective element is produced in one piece by injection molding or casting and has parts which are joined together by movable bridges. The protective element has a bottom segment with a top side, a bottom side, and at least one wall segment, which can be formed to a closed channel section by bending and/or folding the bottom segment toward the top side and securing it with a closing mechanism. Preferably, the protective element is connected or can be connected to other similar protective elements, so that the channel sections form a conduit for lines in a longitudinal direction.

An energy guide chain is known from EP 0 499 809 A1 for guiding of energy conductors, especially cables or tubing, from a fixed connection end to a movable user end. The energy guide chain consists of a multiplicity of chain links which consist of two spaced apart link plates arranged parallel to one another and of two tie bars that connect the link plates.

The mutual pivoting angle of neighboring chain links is limited by cams and inserts having stop faces. The cams of the link plate are arranged in a recess of the link plate and are directed in the longitudinal direction of the link plate. The cams on one end of the link plate are displaced by an angle of 90° in comparison to the cams on the other end of the same link plate, and are arranged in corresponding recesses. Consequently, the connecting line between the cams is at a right angle to the longitudinal axis of the chain link, while the other cams lie on the longitudinal axis of the link plate. An insert placed in the recesses between the neighboring link plates is essentially cylindrical. The insert has two diametrically opposite slits and two recesses. The width of the slits corresponds to the cams, while the recesses extend over a circular arc that determines the pivoting angle of neighboring chain links. The recesses have stop faces, where the stop faces are always arranged diametrically opposite to the insert. For example, the stop faces are displaced by 90° in the mathematically positive direction of rotation with respect to the slits. The angle between the stop faces is predetermined.

The insert defines the maximum horizontal pivoting angle between neighboring chain links. This angle also determines the radius of curvature in the transition region between an upper trunk and a lower trunk of an energy guide chain.

Another embodiment of an energy guide chain for the guiding of tubings, cables and similar devices between two connection locations is known from DE 197 15 531. This energy guide chain is formed from chain links where the chain links have link plates connected to one another through tie bars. These link plates have stops which are arranged asymmetrically with respect to the middle axis running longitudinally along the chain as a mirror axis so that, depending on the orientation of one of these plates with respect to the longitudinal direction of the chain, the angle positions of the boundary angles defined by the stops are different. With this measure, two different curvature behaviors of the energy guide chain can be realized.

SUMMARY OF THE INVENTION

The goal of the present invention is to provide a link plate for an energy guide chain with increased functionality.

A link plate according to the invention includes overlap regions with a central region that is surrounded by at least two areas in which a number of stop faces are arranged. In deviation from the previous constructions of a link plate, as a result of the design of the link plate according to the invention, the stop faces are separated so that the manufacturing as well as the construction expenditures of such a link plate is reduced.

A link plate according to the invention is specifically characterized by the fact that the two regions are designed so that, in an energy guide chain, composed of the link plates, the angle positioning of the energy guide chain is different depending on the pivoting direction. With the aid of this measure, an energy guide chain is predetermined by the regions of defined radius of curvature. In addition, a prestress is introduced into the energy guide chain by the second region, so that the life of an energy guide chain is improved. Moreover, an energy guide chain which is provided with a prestress can support higher line weights.

Specifically, the present invention includes a link plate defining a first region having stop faces that define a curvature region. The link plate is coupled to other link plates and overlap in a transition region between an upper trunk and a lower trunk to form an energy guide chain. The link plate can also include a second region, which also has stop faces, and a guide chain composed of the link plates according to this aspect of the invention induces a prestress of the energy guide chain.

In addition to the two areas or regions described above, the link plate according to the invention can also have a third area or region, which has at least one stop with at least one stop face, and the stop has a spring-elastic characteristic. As a result of the spring-elastic characteristic, damping of the motion during the pivoting of the link plates is achieved.

The stop can be designed so that it has an essentially V-shaped cross-section. The regions in which the stop faces are formed are preferably arranged essentially concentrically to one another.

The shape or form of the stop faces as well as the number of regions may vary greatly. It is influenced by the use of the link plate. Energy guide chains can be made from the same link plates, or link plates having stop faces that are different. With these options, energy guide chains with different characteristics can be constructed.

Preferably the link plate is made of plastic, especially fiber-reinforced plastic. Glass fibers can be used for fiber reinforcement. It is also possible to provide reinforcement with other additives.

The link plate can also be made from a composition which contains at least one renewable raw material, a material binding this renewable raw material as well as additives and/or adjuvants. The material can also consist partially of at least one metal, especially in the form of a powder.

The link plates may have stop faces in different positions on the link plate. As a result of this, it becomes possible to use stop faces arranged in overlap regions, which permit very different angle positions of the energy guide chain.

Regarding the load on the link plates during the motion of the energy guide chain, the design of the stop faces is especially important. In order to be able to produce relatively large stop faces, and that at least a few of the stop faces can be designed essentially to be convex or concave. It is also possible to design the cooperating face pair in such a way that one of the stop faces is concave and the other stop face is convex.

During the operation of conventional energy guide chains, a certain noise is produced as a result of the stop faces coming together and this can be considered unpleasant. In order to reduce the noise emission, at least a few stops can have at least one stop face designed with a spring-elastic characteristic. As a result of this, a damping action is achieved, so that during the operation of an energy guide chain, noise emission can be reduced significantly. The extent of reduction of noise emission depends on the characteristics of the stop faces. The spring-elastic characteristic can be achieved by construction measures.

As a result of the spring-elastic characteristic of the stop faces, sudden braking of the movement of the link plates is also reduced. This can be achieved by construction so that, for example, the cross-section of the stop is made essentially V-shaped.

To further reduce the noise emission and to achieve an even further improvement of the braking of a pivoting process of two neighboring link plates of an energy guide chain, at least one stop face can be made of a first material, and the stop face can have at least one region which is formed from a second material which has lower hardness in comparison to the first material. The manufacture of such a stop face can be done, for example, according to a two-component injection process. Alternatively, the area can also be provided, for example, with elements including a soft-elastic plastic. These elements can be joined to the stop faces by positive and/or nonpositive locking in the form of knobs.

Further details and advantages will be explained with the aid of practical examples represented in the drawings, without limiting the object of the invention to these concrete practical examples.

BRIEF DESCRIPTION OF THE DRAWINGS

FIG. 5 shows an enlarged stop, FIG. 6 shows schematically a top view of a constellation of two stops, FIG. 7 shows schematically a top view of a variation of a stop and FIG. 8 shows a variation of a stop in cross-section and as a top view.

DETAILED DESCRIPTION OF THE PREFERRED EMBODIMENTS

Figure 1:
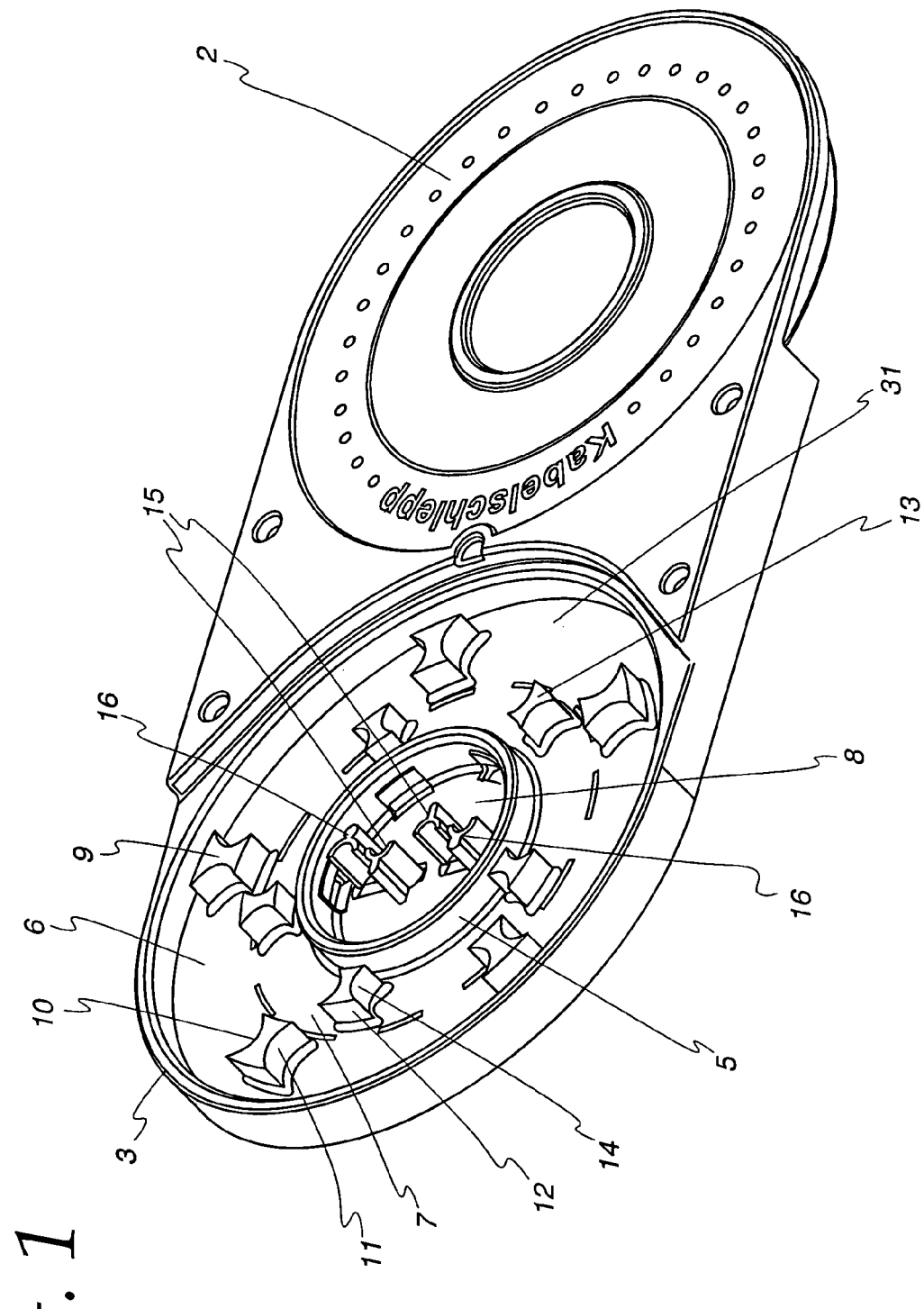
FIG. 1 is a link plate according to the invention in a perspective view from the front.
Figure 2:
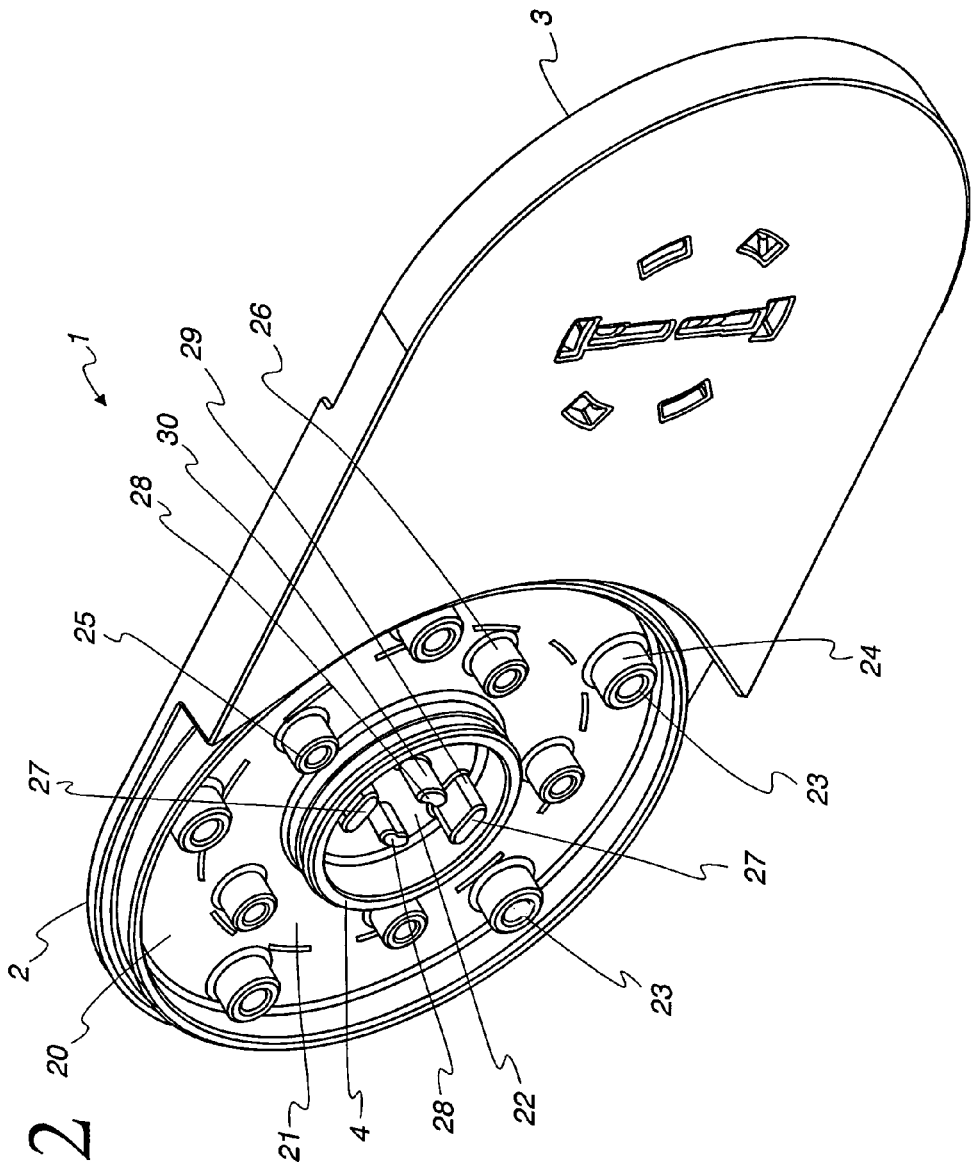
FIG. 2 shows the link plate of FIG. 1 in a back view.
Figure 3:
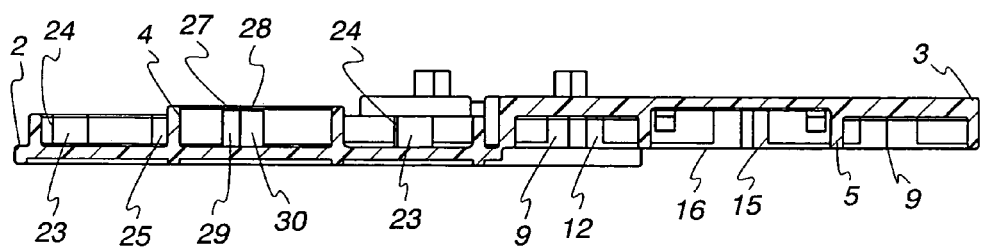
FIG. 3 shows the link plate according to FIG. 1 in longitudinal cross-section.
Figure 4:
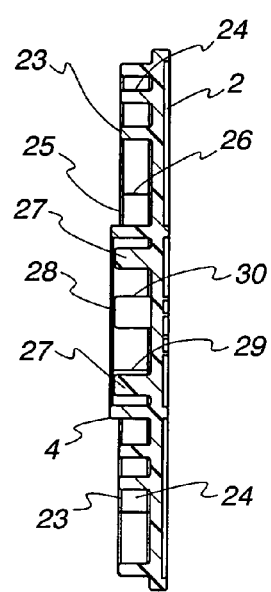
FIG. 4 is the cross-section of an overlap region in the link plate.

FIGS. 1 and 2 illustrate an example of a link plate 1 according to the invention. The link plate 1 is designed as an elongated body. It has an overlap region 2, 3 at each of its end regions. The overlap regions 2, 3 are designed so that the overlap region 2 of a first chain link cooperates with an overlap region 3 of a second link plate.

Two neighboring link plates can be set at an angle around a common axis. For this purpose, the overlap region 2 has a first link 4. This first link 4 is preferably tubular in the example shown. A second link 5 cooperates with the first link 4, which is provided in overlap region 3. The second link 5 is also preferably designed to be essentially tubular. The inside diameter of the second link 5 is somewhat greater than the outside diameter of the first link 4, so that the first link 4 can be introduced into the second link 5 and can be pivoted around the longitudinal axis of the links.

For attachment, the links 4, 5 may have locking devices, preferably of a spring-groove type. It is not necessary that the links, as they are represented in the practical example herein, be designed essentially tubular. There is also the possibility to design the first link in the form of a link peg and the second link in the form of a link receptacle. The locking devices formed on the links provide a separable joint between two neighboring plates. However, the joint is designed so that a certain force is necessary to separate the plates. With the aid of the locking devices, which are formed on the links, the plate connection can be retained even during the operation of the energy guide chain. The locking connection between the links can also be used as an aid for purposes of assembly of the energy guide chain.

In FIG. 1, in the overlap region 3, a dashed line is shown which subdivides the overlap region 3 into a first region 6 and a second region 7. This subdivision is an imaginary theoretical subdivision. The overlap region is divided by the second link 5 into a third region 8. The regions are arranged essentially concentrically to one another. They surround a central region of overlap region 3.

In the practical example shown, the first region 6 has five stops 9. Looking in the peripheral direction, the stops are equidistant to one another. Each stop has two stop faces 10, 11. The stop faces 10, 11 are curved in a concave manner in the practical example shown.

The second region 7 has stops 12. Each stop 12 within the second region 7 has two stop faces 13, 14. The stop faces 13, 14 of stops 12 are designed in a concavely curved manner in the practical example shown.

Stops 15, 16 are provided within the third region 8. Stops 16 lie on an imaginary circle on which stops 15 are arranged. Stops 15 have concave stop faces 17. Stops 16 also have concave stop faces 18.

Stops 9, 12, 15 and 16 with their stop faces cooperate with the corresponding stops formed in overlap region 2. For this purpose, overlap region 2 is subdivided into three areas 20, 21 and 22. Areas 20, 21 are concentric to one another around a central region of overlap region 2. Stops 23 are arranged within the first region 20. The number of stops 23 corresponds to the number of stops 9 in overlap region 3. In the practical example shown, stops 23 are designed essentially to be cylindrical. Each of the lateral surface of stops 23 essentially forms a stop face 24.

In the practical example shown, the stops 23 are designed to be cylindrical. The diameter of stop 23 and the curvature of stop faces 10, 11 are preferably adjusted to one another in such a way that the load on the surfaces is as uniform as possible when the stop faces of stops 9 and 23 lie against one another. As a result of this, the surface pressure can also be minimized.

The stops 9, 23 are arranged so that, in the extended position of energy guide chain, it will be prestressed. The extent of prestressing depends on the displacement of the cooperating stops 9, 23.

Stops 25 are arranged within the second region 21. Each of stops 25 has a stop face 26. It is formed by the lateral surface of the cylindrical stop 25. Other configurations or shapes of stop 25 are also possible. Regarding geometry, stop faces 26 are designed so that they cooperate with the stop faces 13, 14 of stop 12. Through the position and number of stops 12, 25, the pivoting angle of two neighboring link plates is determined. By changing the geometry and/or position of stops 12 and 25, or by increasing the number of stops 12, 25, the pivoting angle can be increased or reduced. This pivoting angle also determines the radius of curvature of the transition region. The transition region lies between an upper trunk and a lower trunk of an energy guide chain.

Within the third region 22, which is arranged in the practical example shown within the tubularly designed first link 4, two stops 27 and two stops 28 are arranged. Stops 27 and 28 have a cylindrical shape. Each of them has stop faces 29 and 30. Stops 27 cooperate with stops 16 and stops 28 cooperate with stops 15. These stops 15, 16, 27 and 28 are designed so that they have a damping effect against the end of the angular movement of neighboring plates. Here, stops 27, 28 and 15, 16 have such a configuration that they serve as damping agents for the damping of the radius of curvature and/or damping of the prestressing.

FIG. 5 shows an enlargement of a stop 15 or 16. The stop 15 is linked to a bottom wall 31 of the overlap region 3. A gap 34 is provided between an element 32 and the bottom wall 31. The element 32 of stop 15 is stiffened by a rib 33 and is joined to bottom wall 31.

In FIG. 6, stop 15, as well as a stop 28 cooperating with stop 15, is shown in a top view. Stop 28 has a diameter D. The element 32 has an essentially bowl-shaped cross-section and it has stop faces 17. The inside width L of the bowl-shaped element 32 is somewhat smaller than the diameter D of stop 20. When two neighboring connected link plates are pivoted relative to one another, then stop 28 with its stop face 30 will lie against stop face 17. As a result of this, the element is spread out, which will involve damping of the movement.

Stops 16 and 27 are designed correspondingly in the practical example shown.

FIG. 7 shows another practical example of a stop 15 and 16. This embodiment differs by the fact that the element 32 has an essentially V-shaped cross-section. The functionality of this element 32 corresponds essentially to the functionality of element 32, as shown in FIG. 6.

A link plate is shown in FIGS. 1 and 2, which has three functional regions. In a first functional region, stops with stop faces are arranged which determine the prestressing of an energy guide chain. In the second functional region, stops are arranged which are responsible for adjusting the angle position in the radius of curvature. In the third functional region, stops are provided which are responsible for damping. It is not absolutely necessary for a link plate to have three functional regions. If no damping is to be provided, then the third functional region can be eliminated. However, there is also the possibility to provide damping in such a way that a third functional region is not absolutely necessary. Such a possibility exists in the fact that at least one stop face is made from a first material, where the stop face has at least one region which is made of a second material that is not as hard as the first material.

FIG. 8 shows a modification of stop 9. The modification consists in the fact that the stop faces 10, 11 are made of materials having different hardnesses. The stop face 10 has a surface area 10*a* and a surface area 10*b*. Surface area 10*a* is made of a material with greater hardness. The surface area 10*b* is made of a material with a lower hardness. This material can be, for example, rubber or comparable materials.

Face 11 also has a partial surface 11*a* and a partial surface 11*b*, where surface 11*a* is made of the same material as surface 10*a* of surface area 11*b* made of the same material as partial surface 10*b*. The damping material can be applied on stop 9, for example, using the so-called two-component injection method. In order to increase bonding strength, stop 9 has a bore 35. Instead of a bore 35, a slit can be provided which extends partially from the free end of stop 9 in the direction of the bottom wall 31. Instead of a two-component injection method, a stop can be provided with a damping element, where the damping element is joined to the stop with positive and/or nonpositive locking.

The invention claimed is:

1. A link plate for an energy guide chain, the link plate comprising:
   a first overlap region and a second overlap region, each overlap including a central region and a first outer region and a second outer region surrounding the central region; and a stop face joined to each outer region.

2. The link plate according to claim 1, wherein the first and second outer regions comprise stop faces spaced irregularly relative to one another whereby an angular position of an energy guide chain composed of such link plates to be different depending on the pivoting direction.

3. The link plate according to claim 1, characterized by a first region having a plurality of stop faces arranged to provide prestressing of an energy link chain in an energy guide chain composed of a plurality of such link plates.

4. The link plate according to claim 1, wherein the second outer region, comprises stop faces defining a radius of curvature in a transition region between a lower trunk and an upper trunk of an energy guide chain composed of such link plates.

5. The link plate according to claim 1, further comprising a stop joined to the central region, each stop having a stop face with a spring-elastic surface.

6. The link plate according to claim 1, wherein the central and outer regions are substantially concentric with respect to one another.

7. The link plate according to claim 1, wherein the stop faces are substantially convex in shape.

8. The link plate according to claim 1, wherein the stop faces are substantially concave in shape.

9. A link plate for an energy guide chain, the link plate comprising:
   a first overlap region and a second overlap region, each overlap including a central region and a first outer region and a second outer region surrounding the central region;
   a stop face joined to each outer region; and
   a stop joined to the central region, each stop having a stop face with a spring-elastic surface and wherein the stop has a substantially V-shaped cross-section.

10. A link plate for an energy guide chain, the link plate comprising:

a first overlap region and a second overlap region, each overlap including a central region and a first outer region and a second outer region surrounding the central region;

a stop face joined to each outer region; and a stop joined to the central region, each stop having a stop face with a spring-elastic surface wherein the stop face is made of a first material, and wherein the stop face has a contact region which is made of a second material having a lower hardness than the first material.

11. An energy guide chain, formed from link plates, wherein at least one link plate comprises:

a first overlap region and a second overlap region, each overlap including a central region and a first outer region and a second outer region surrounding the central region; and a stop face joined to each outer region.

12. The energy guide chain according to claim 11, wherein the stops are disposed on the two outer regions to define an angular position of the energy guide chain that varies depending on the pivoting direction of the energy guide chain.

13. The link plate according to claim 11, wherein a first region has stop faces disposed at positions to prestress the energy guide chain.

14. The energy guide chain according to claim 11, wherein the second outer region has stop faces disposed at positions to define a radius of curvature in a transition region between a lower trunk and an upper trunk.

15. The energy guide chain according to claim 11, and further comprising a stop joined to the central region, wherein the stop has a stop face with a spring-elastic surface.

16. The energy guide chain according to claim 11, wherein the stop is substantially V-shaped in cross-section.

17. The energy guide chain according to claim 11, wherein the stop face is made of a first material, and the stop face comprises at least one region which is made of a second material of a lower hardness than the first material.

18. The energy guide chain according to claim 11, wherein the central and outer regions of the link plate are substantially concentric with respect to one another.

19. The energy guide chain according to claim 11, wherein the stop faces are substantially convex in shape.

20. The energy guide chain according to claim 11, wherein the stop faces are substantially concave in shape.

* * * * *